(12) United States Patent  
Inui

(10) Patent No.: US 7,280,531 B2  
(45) Date of Patent: Oct. 9, 2007

(54) TELEPHONE COMMUNICATION SYSTEM

(75) Inventor: Masanori Inui, Hachioji (JP)

(73) Assignee: Iwatsu Electric Co., Ltd., Tokyo-To (JP)

( * ) Notice: Subject to any disclaimer, the term of this patent is extended or adjusted under 35 U.S.C. 154(b) by 923 days.

(21) Appl. No.: 10/134,776

(22) Filed: Apr. 29, 2002

(65) Prior Publication Data

US 2003/0202503 A1    Oct. 30, 2003

(51) Int. Cl.
*H04L 12/66* (2006.01)

(52) U.S. Cl. ....................................... 370/352; 370/386
(58) Field of Classification Search ........ 370/351–358, 370/230, 386, 389, 401, 395.21, 395.52, 370/395.5, 392, 402

See application file for complete search history.

(56) References Cited

U.S. PATENT DOCUMENTS

| | | | | |
|---|---|---|---|---|
| 6,760,324 B1* | 7/2004 | Scott et al. | ................. | 370/352 |
| 6,795,430 B1* | 9/2004 | Ong et al. | ................... | 370/352 |
| 2001/0036164 A1* | 11/2001 | Kakemizu et al. | .......... | 370/331 |
| 2002/0073203 A1* | 6/2002 | Gilleland | .................... | 709/227 |
| 2004/0028035 A1* | 2/2004 | Read | .......................... | 370/352 |

FOREIGN PATENT DOCUMENTS

JP          07135534 A          5/1995

* cited by examiner

*Primary Examiner*—Brenda Pham
(74) *Attorney, Agent, or Firm*—Cohen Pontani Lieberman & Pavane LLP

(57) ABSTRACT

A telephone communication system is disclosed, in which a plurality of telephone stations based on an Internet protocol are connected to a LAN network to form an IP network including at least one constituent unit. Each constituent unit of said IP network, comprising: SIP server means based on a protocol defined for controlling the start, end and change of a session of an interactive communication; resource management server means for the control storage and delivery of station state databases of said plurality of telephone stations, and application server means. The SIP server means, the resource management server means and the application server means are connected to said LAN internet for offering required services to said plurality of telephone stations, so that information transmission among said plurality of telephone stations and each of said server means are performed on a packet-wise basis.

6 Claims, 7 Drawing Sheets

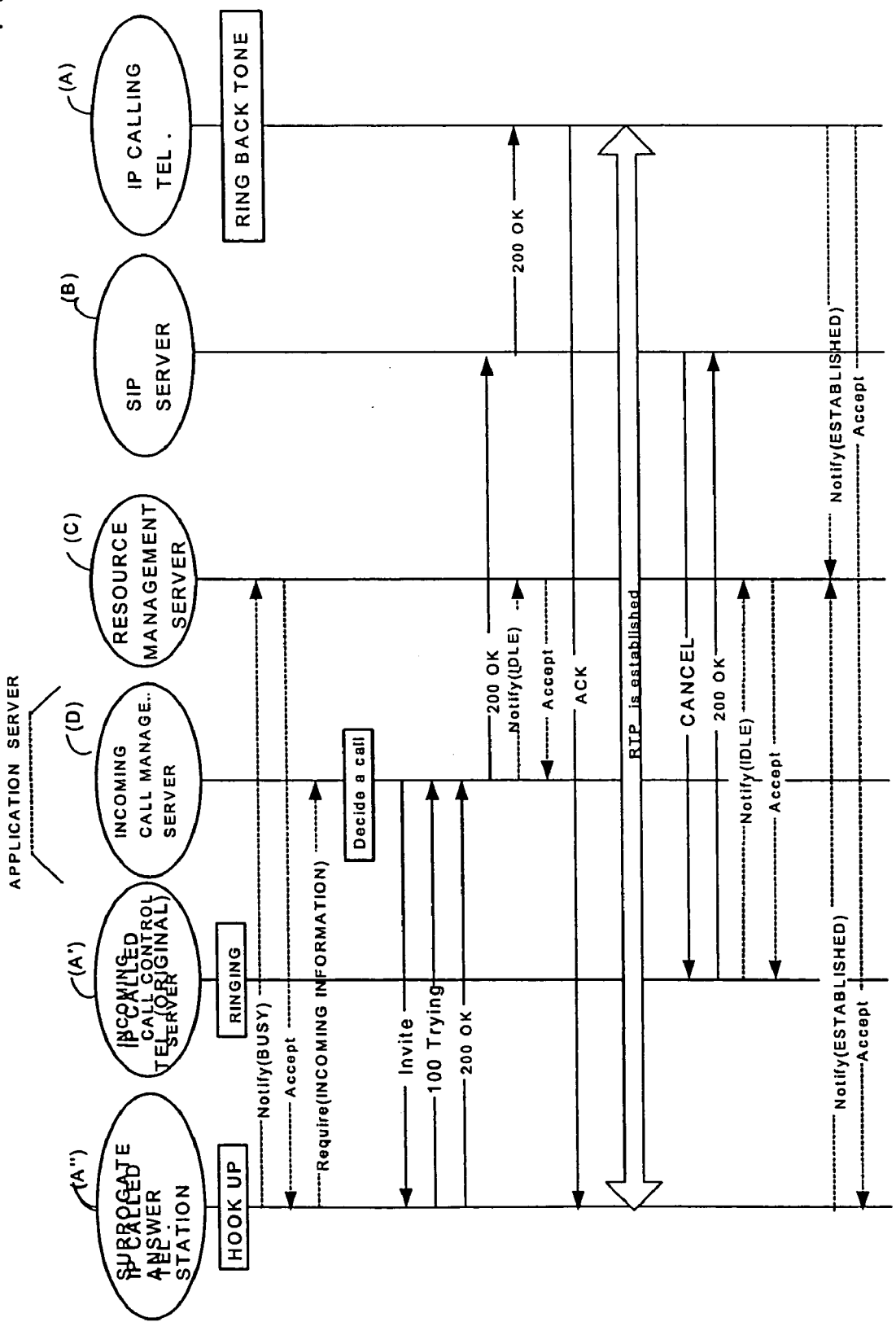

TELEPHONE COMMUNICATION SYSTEM

BACKGROUND OF THE INVENTION

1. Field of the Invention

The present invention relates to a telephone system that performs switching and processing of telephone information for its transmission and, more particularly, to a telephone communication system that interconnects a plurality of telephone stations via a network and performs switching, control and other forms of processing necessary for the transmission of telephone information between the telephone stations.

2. Description of the Prior Art

For example, because a key telephone system is now in wide use as a conventional telephone communication system and PBX is also widespread as a local telephone system, these convey daily telephone information.

Of these conventional telephone communication systems, the key telephone system is of "a" build-in" type. Therefore, it has been equipped with functions one after another, in a piecemeal fashion, along with the various stages of development of the infrastructure of our society. As a result of this, software has become bloated and the interface configuration has become accordingly complex, making it very difficult to change functions and add new functions. Further, because station states and subscriber data are placed under centralized control by a key service unit, the extension of the system scale is restricted by the ability of the main processor, and hence the system extension is difficult to implement. Besides, the construction of a local extension network by connection principal locations requires a contract for a leased telephone communication line, inevitably raising the operating costs of the system.

In the case of PBX, because its scale is large, the above-mentioned difficulties and defects become even more severe than with the conventional systems.

For the reasons given above, the prior art solutions find it difficult to implement a simple-structured system that both efficiently performs switching, control and other processing functions necessary for the conveyance of telephone information between stations and also can deal with an increase or decrease in the number of stations in the system with a high degree of flexibility.

SUMMARY OF THE INVENTION

An object of the present invention is to provide a telephone communication system for performing efficient transmission of telephone information between stations and obtaining great adaptability to an increase or decrease in the number of stations accommodated in the system with high flexibility.

To attain the above object, the telephone communication system according to the present invention is constructed so that:

a plurality of telephone stations based on an Internet protocol are connected to a LAN network to form an IP network;

for each constituent unit of said IP network, an SIP server function based on a protocol defined for controlling the start, end and change of a session of an interactive communication; a resource management server function for the control storage and delivery of station state databases of said plurality of telephone stations, and an application server function for offering required services to said plurality of telephone stations are connected to said LAN network; and information transmission between said plurality of telephone stations and each of said server functions provided as said control functions is performed on a packet-wise basis.

The above-mentioned application server function is, for example, an incoming call management server.

That is, the telephone communication system according to the present invention adopts a system for transmitting information as a packet-wise basis, in which each packet has a packet header added to a fixed-length or variable-length data part.

To implement this voice packet communication, for instance, over an IP network, a voice-over-IP-control system uses the following SIP (RFC2543), SDP (RFC2327) and RTP (RFC1889)/RTCP (RFC1890).

(a) SIP (Session Initiation Protocol):

This is a protocol defined to control the start, end and change of a session of the interactive communication.

(b) SDP (Session Description Protocol):

This is a protocol used to display media types required by communication stations for providing multimedia communications.

(c) RTP (Realtime Transport Protocol):

This is a protocol defined for exchange real-time information on the IP network.

(d) RTCP (Realtime Transport Control Protocol):

This is a protocol defined to monitor the communication state in communications using the RTP Mealtime Transport Protocol).

A software interface can be configured as an IP key telephone system by defining voice information, call control information and key telephone service information as IP packets, respectively, based on the principle that data exchange is carried out in a standardized format called an IP packet in an IP (Internet Protocol) network environment.

BRIEF DESCRIPTION OF THE DRAWINGS

The objects, features and advantages of the present invention will become more apparent from the following description taken in conjunction with the accompanying drawings, in which:

FIG. 7 is a flowchart explanatory of a sequence of telephone answering service in the system of the present invention.

DETAILED DESCRIPTION OF THE PREFERRED EMBODIMENTS

Figure 1:
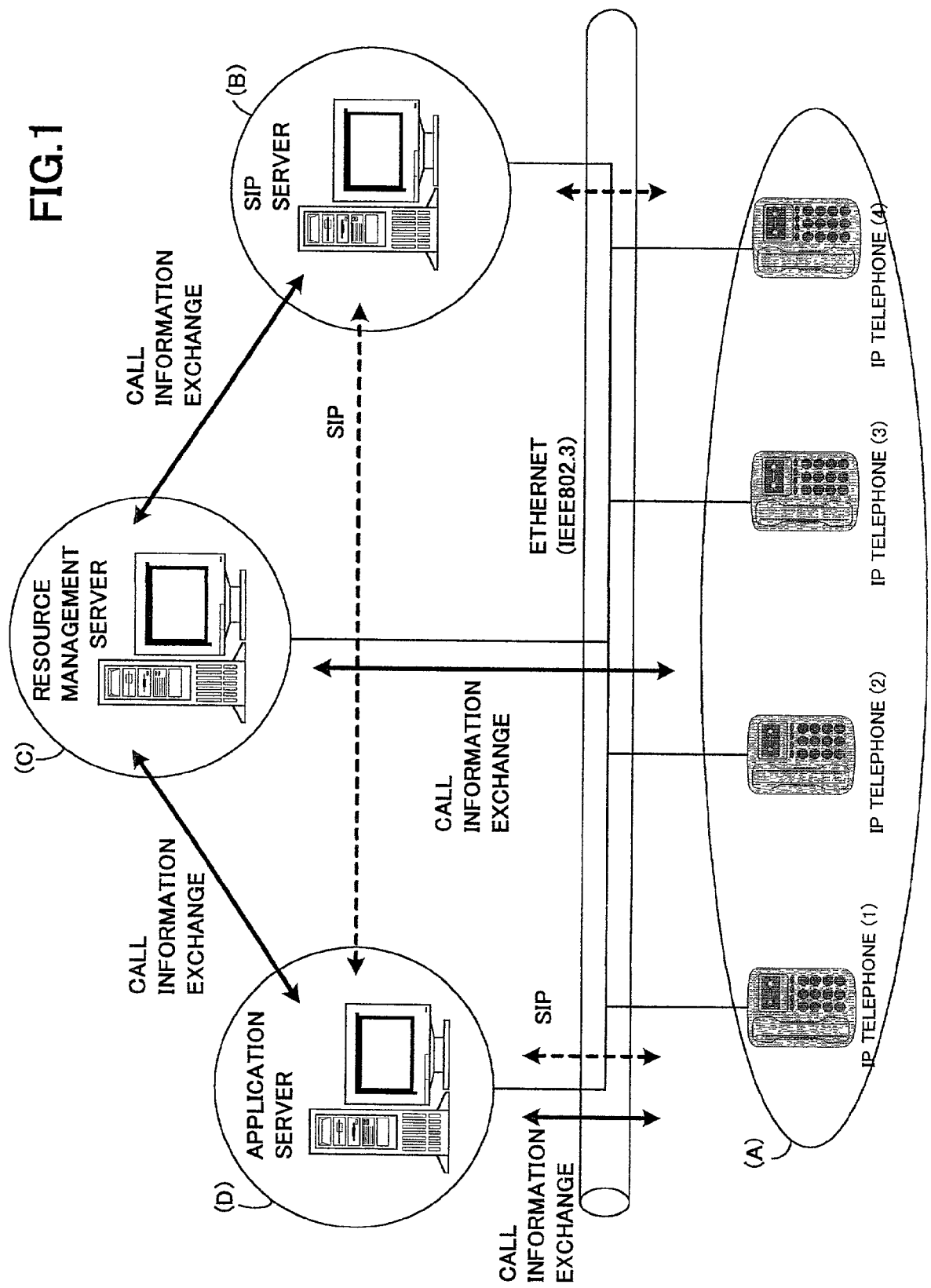
FIG. 1 is a block diagram illustrating a basic configuration of the telephone communication system according to the present invention.

To provide services equivalent to those of the conventional key telephone system by the use of stations connected to an IP network and to enhance system extensibility, (a) IP telephone, (B) SIP server, (C) resource management server and (D) application server are arranged into four functional blocks as depicted in FIG. 1. Given below are definitions of the functions (A), (B), (C) and (D).

(A) IP Telephone:
This is a LAN station based on IEEE802.3 and equipped with an SIP user agent function.

(B) SIP Server:
This is a LAN station based on IEEE802.3 and equipped with an SIP server function.

(C) Resource Management Server:
This is a LAN station based on IEEE802.3 and equipped with a server function that controls, stores and allots a station state database on the stations belonging to the IP key telephone system.

(D) Application Server:
This is a LAN station based on IEEE802.3 and equipped with a server function that provides an incoming call service of the IP key telephone system.

Here, a computer of the CSMA/CD (Carrier Sense Multiple Access/Collision Detection) system, which has a bus-type transmission line connecting mode or configuration and transmits data, provides a transmission packet onto the transmission line after making sure that no packets are transmitted in the transmission line. In the event of a collision with a packet sent out from another computer at about the same time, the computer sends out an interference signal for a fixed period of time and re-transmits the packet after a waiting time based on a random number. The system is so simple in configuration that, when traffic is smaller than the channel capacity of the transmission line, an efficient transmission can be achieved with an infrequent occurrence of the collision between packets; however, an increase in traffic causes frequent retransmissions by the collision between packets, resulting in increased delays. This system is called Ethernet after its service name.

That is, distributing of centralized hardware of the key telephone system to LAN station of such Ethernet as shown in FIG. 1 permits system extension that does not dependent solely on the capability of a centralized controller.

By combining these distributed functional blocks with one another, it is possible to constitute such a telephone system as shown in Table 1.

The respective systems mentioned above possess the following functions.

(a) IP Telephone Set:
This provides services that permit a 1-to-1 communication between IP telephone stations.

(b) Individual IP Telephone System:
This provides services equivalent to those by a conventional subscriber's telephone set.

(c) Multi-Function IP Telephone System:
This provides such services for state-displaying telephone sets employed in the system or for calling them with a one-touch operation.

(d) Full IP Telephone System:
This provides an incoming call management service, such as incoming call allotment, simultaneous incoming calls or discriminated incoming calls, and voice-data integrated services such as voice mail and IVR (Interactive Voice Response).

Such a function distribution system as shown in FIG. 1 allows ease in defining the signal format of information communication between functional blocks as a common IP packet and enables each function to become independent with ease. The reason for this is that the use of the IP packet as a data interface between the functional blocks brings about a situation of their loose coupling. Accordingly, the system can be built without making great difference between processing the functional blocks by independent processors and processing them by a single processor.

The resource management sever (C) is a device that controls and stores "station state information" for displaying the usage of station, such as a station stage lamp display or LCD display realized by conventional key telephone systems. The resource management server (C) is placed in each minimum node of the IP key telephone system built over the IP network.

The IP telephone (A) belonging to the node of the IP key telephone system sends "state change information" indicating its change to the resource management server (C) that takes control of the node.

Upon receiving the "state change information" from a station belonging to its node, or upon detecting a state change of the station during monitoring the station state at regular time intervals, the resource management server (C) indicates the station state to all stations belonging to the node, or stations having pre-requested the notification of the "station state information."

The station, which has thus received the "station state information," is allowed to display the key set state of its

TABLE 1

| | Telephone System Configuration | | | |
|---|---|---|---|---|
| System | (A) Telephone | (B) SIP Server | (C) Resource Management Server | (D) Application Server |
| a. IP Telephone | 0 | | | |
| b. Independent IP Telephone System | 0 | 0 | | |
| c. Multi-Function Telephone | 0 | 0 | 0 | |
| d. Full IP telephone System | 0 | 0 | 0 | 0 | own, or the state of the station corresponding to the received information according to the ability of the display used.

The "station state information" held by the resource management server (C) can be always referred to by inquiring from stations belonging to its node, or resource management servers (C) that control other nodes.

The control information is defined merely as information indicating the station state. The IP telephone (A) is capable of extracting from the information an element expressible by its hardware resource and providing an appropriate display.

Figure 2:
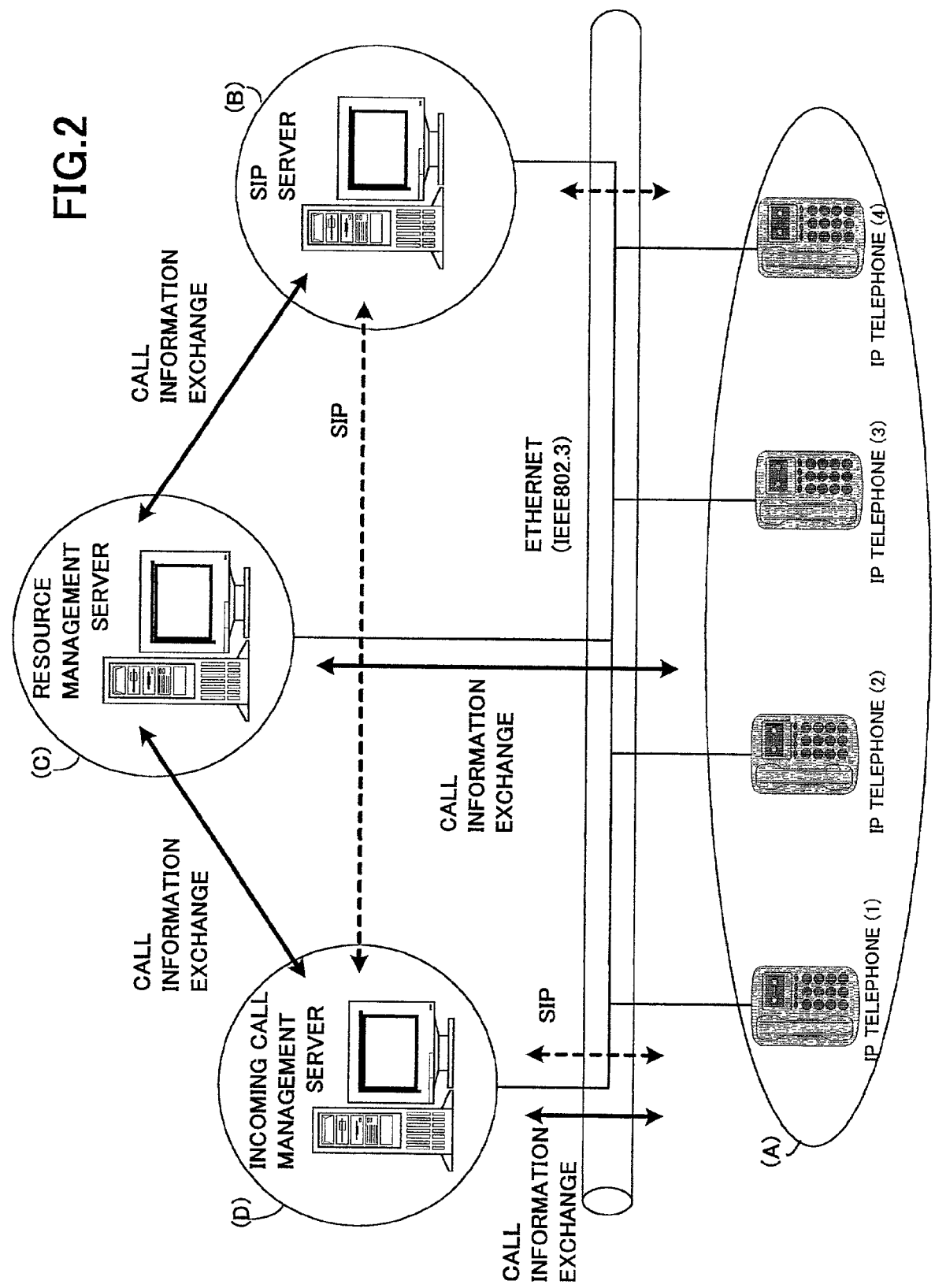
FIG. 2 is a block diagram depicting a single node in the system of the present invention.

The present invention permits construction of such an IP key telephone system as depicted in FIG. 2.

FIG. 2 illustrates a constituent unit of the IP key telephone system. These units can be combined into such a global or wide area IP key telephone network as shown in FIG. 3.

One of applications usable in FIG. 2 is an incoming-call service. By placing on the IP network the incoming call management server (application server) (D) that controls "incoming call information," it is possible to implement as an IP key telephone system the incoming call receiving functions offered by the conventional key telephone system, such as ordinary incoming call reception, telephone answering services and group incoming calls.

Figure 3:
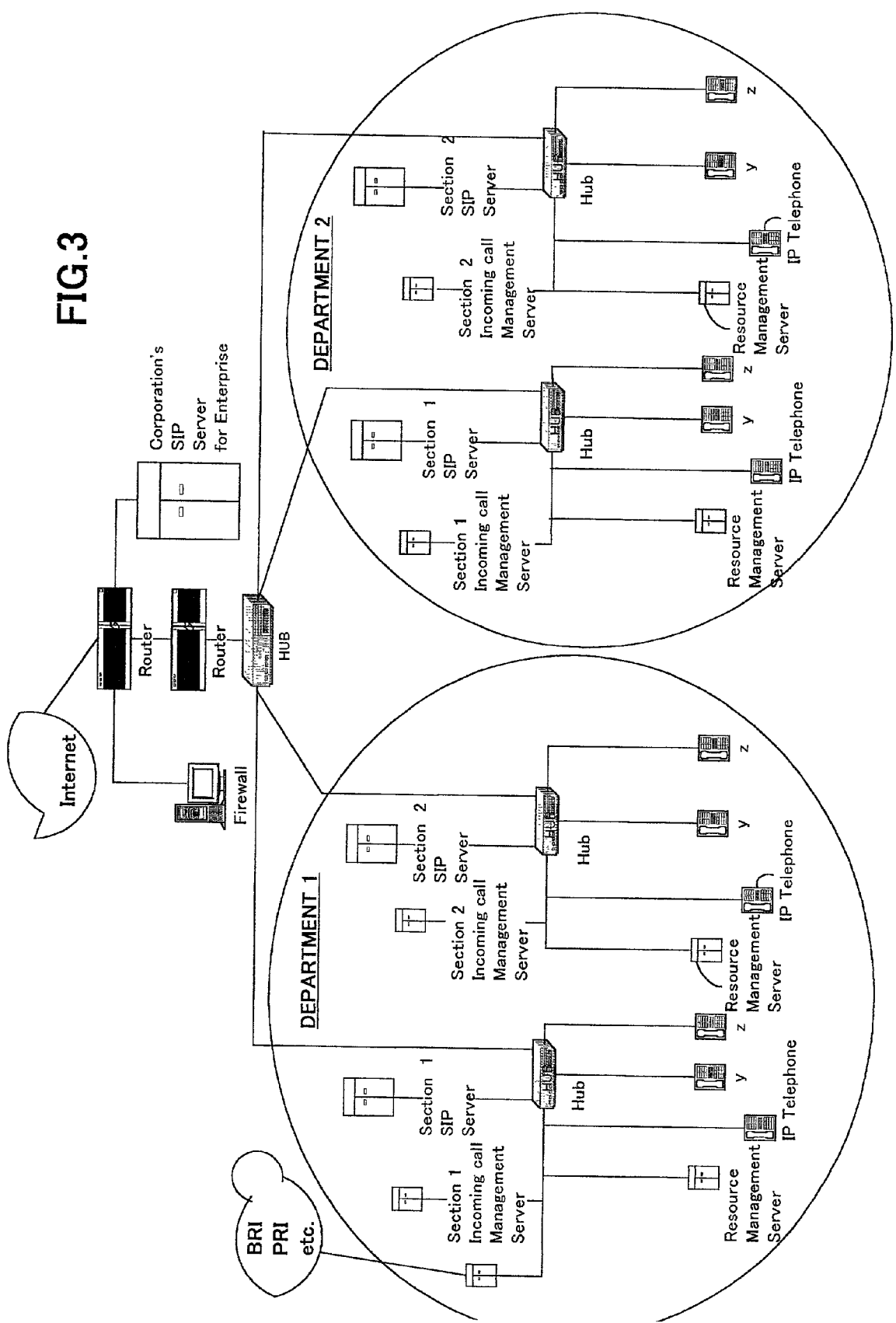
FIG. 3 is a block diagram illustrating an example of the system configuration of the present invention.

FIG. 3 is a systematic connection diagram, in which communication network for a corporation are formed by the IP network and are connected to the Internet. To prevent against unauthorized access from the Internet side to information stored in the communication network of the corporation, a firewall is located in each edge part connected to the Internet. In order to relay call-control signal information provided using SIP, a corporation-wide SIP server is further provided for entire supervisory of the corporation. The IP network is roughly divided into Department 1 and Department 2, each of which is subdivided into sections. Each of the sections comprises an SIP server, a resource management server and an incoming call management server, so that the constituent elements of the basic model are provided for each section. The IP network is adapted so that to perform information transmission between sections, the SIP server and the resource management server detect the states of IP telephone sets so that SIP call control information is exchanged. Moreover, connections to a conventional telephone network can be established through a PSTN/ISDN gateway placed in each section by the use of BRI (Basic Rate Interface), or PRI (Private Rate Interface), etc.

Figure 4:
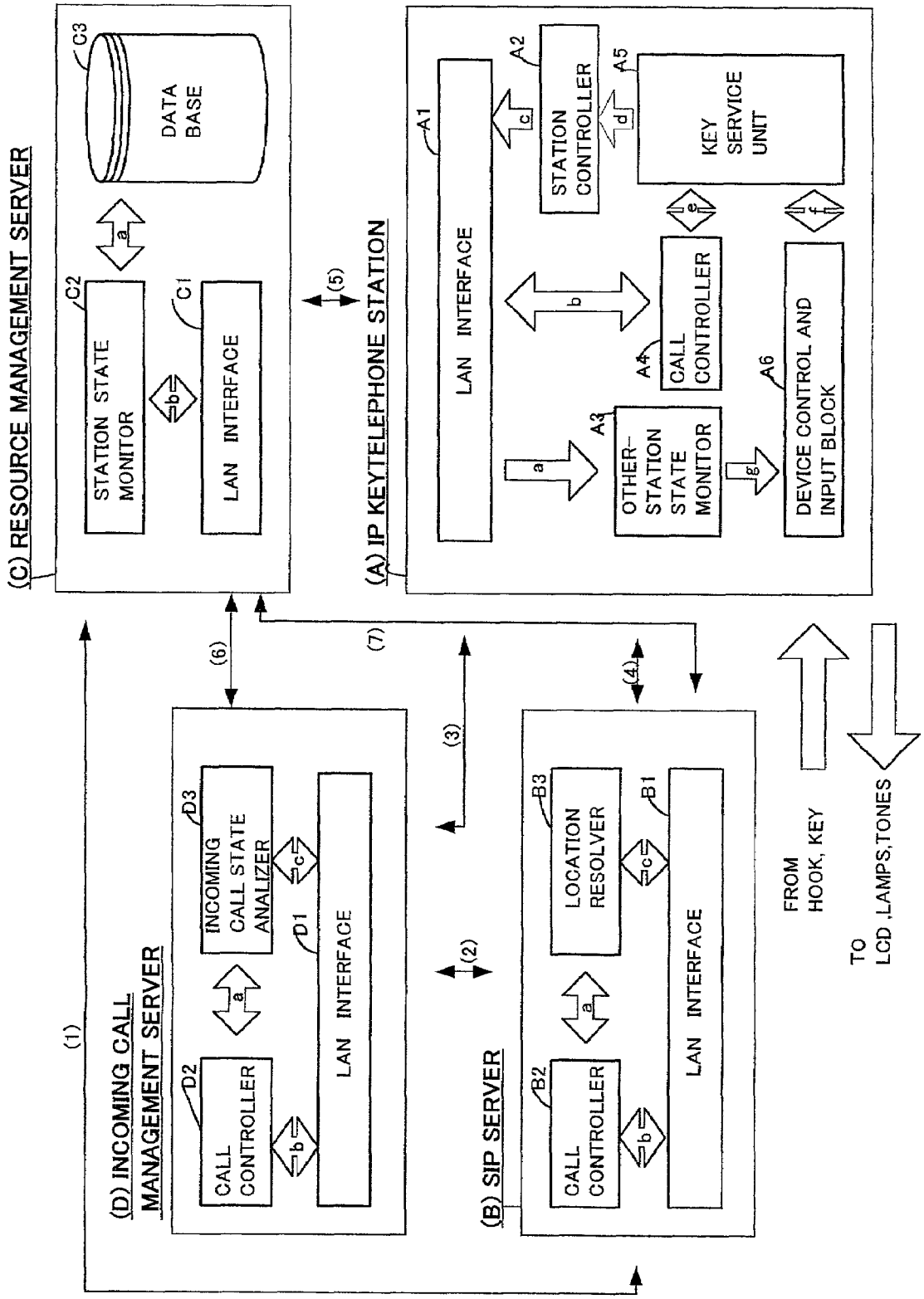
FIG. 4 is a diagram explanatory of the transmission of communication information in the system of the present invention.

FIG. 4 is a diagram illustrating software functional blocks and information exchange interfaces in the constituent elements of the IP telephone system.

(A) IP Key Telephone Station:

This exchanges information with LAN stations [resource management server (C), SIP server (B) and incoming call management server (D)] through a LAN interface A1 over respective paths (5), (4) and (3). A call controller (A4) performs a server function for accepting SIP call control signals and a function for starting the origination of a call. A device control and input block (A6) controls a keypad and similar hardware mounted on a common telephone set. An other-station state monitor (A3) monitors the using state of other telephone sets at regularly time intervals to display them by lamps or display mounted in the key telephone set. The information of the other stations is available from the resource management server (C). A key service unit (A5) performs processing operations which are completed within the station, such as control of the station state, connection or disconnection of the channel, or display control. A change in the state of the station by its operation is indicated to the resource management server (C) via a station controller (A2).

(B) SIP Server:

This exchanges information with LAN stations [resource management server (C), SIP server (B) and IP key telephone management (A)] through a LAN interface B1 over a path (1), internal paths (b) and (c) and a path (4). A call controller (B2) performs a server function for accepting SIP call control. A destination deciding unit (B3) decides the station to which an SIP call control signal is transferred.

(C) Resource Management Server:

This exchanges information with LAN stations [incoming call management server (D), SIP server (B) and IP key telephone station (A)] through a LAN interface C1 over respective paths (6), (7) and (5). A station state monitor (C2) updates state change information from the LAN stations, and also responds to an inquiry from the LAN station (A) to make public the station ID and the contents of a station state database (C3).

(D) Incoming Call Management Server:

This exchanges information with LAN stations [resource management server (C), SIP server (B) and IP key telephone station (A)] through a LAN interface D1 over respective paths (6), (7) and (5). A call controller (D2) implements a server function for accepting SIP call control. An incoming call state analyzer (D3) accumulates incoming calls, and also answers an inquiry about the presence or absence of an incoming call.

The IP key telephone system of FIG. 2 can be implemented by a software configuration depicted in FIG. 4.

A brief description will be given of each operation of the IP key telephone system.

Figure 5:
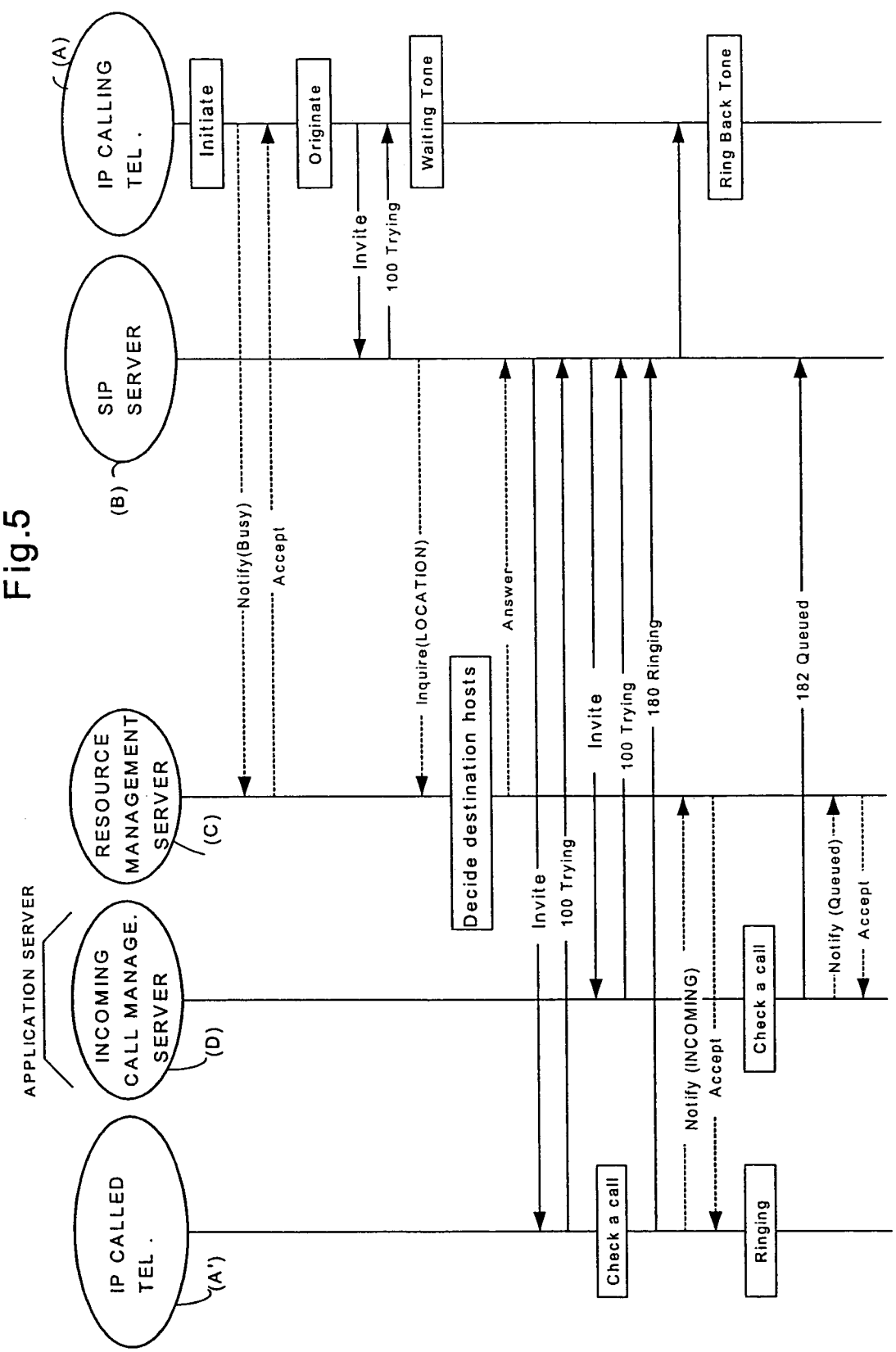
FIG. 5 is a flowchart explanatory of a call-originating sequence in the system of the present invention.

FIG. 5 is a diagrammatic representation of the call originating sequence in the IP telephone system of the present invention.

An originating IP station (A) performs a call-acquisition operation by hanging up the handset to automatically send out a call-acquisition message (Notify: BUSY) that notifies the resource management server (C) of the station having entered the busy condition.

Upon receiving the message, the resource management server (C) updates the database to record the condition "busy" of the calling station (A) and, at the same time, sends out a detection-accept message (Accept) in answer to the notification.

Following this, the originating IP station (A) performs a destination specifying operation as by dialing to send out a call-originating message (INVITE) defined by RFC2543, to the SIP server (B).

The SIP server (B) answers the originating message by a temporary accept-answer response message (100 Trying) similarly defined by RFC2543 and, at the same time, sends out a location search request message (Inquire: LOCATION) to the resource management server (C) to search for the destination.

Upon accepting the message, the resource management server (C) searches for a terminable destination station based on destination information, and sends out an "Answer" message.

Upon receiving the message, the SIP server (B) sends the originating message (INVITE) defined by RCF2543 to the ultimate destination station. At the same time, the SIP server (B) sends the originating message (INVITE) as well to the incoming call management server (D) so as to make telephone answering services available.

A called station (A') answers by the temporary accept-answer response message (100 trying) similarly defined by RFC2543 and, at the same time, decides whether or not to be capable of receiving the call. If the station is capable of receiving the call, it sends out an incoming-call ringing start message (180 Ringing) defined by RFC2543, and at the same time, sends an incoming-call message (Notify: INCOMING) to the resource management server (C) to notify it that the station is busy.

The incoming call management server (D) answers by sending out the temporary accept-answer response message (100 Trying) defined by RFC 543 and, at the same time decides whether or not to be capable of incoming-call queuing. If so, the incoming call management server (D) sends out an incoming-call queuing message (182 Queued) defined by RFC 2543, and at the same time, sends an incoming-call queuing message (Notify: QUEUED) to the resource management server (C) to notify it that the server (D) is busy.

Upon receiving the incoming-call message (Notify: INCOMIN) or incoming-call queuing message (Notify: QUEUED), the resource management server (C) updates the database to record that the called station (A') is in a call-receiving or incoming-call queuing condition, and answers by sending out a call-receiving notification accept (Accept) or call-queuing notification accept (Accept) message.

Figure 6:
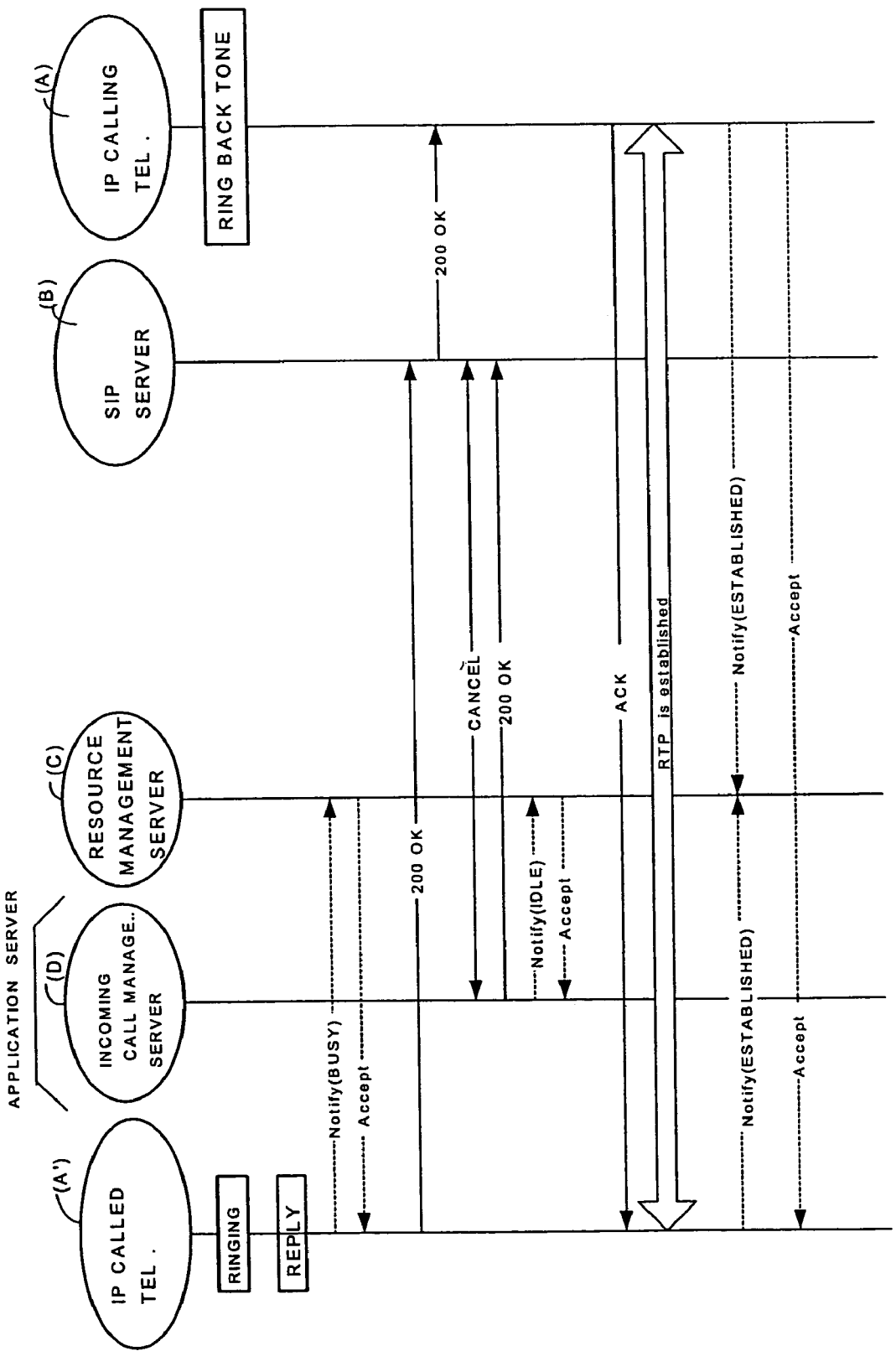
FIG. 6 is a flowchart explanatory of an incoming call-answering sequence in the system of the present invention.

(2) Call-Answer Sequence:

FIG. 6 is a diagrammatic showing of a call-answer sequence in the IP telephone system of the present invention.

The IP station (A') established to a called state performs a call detecting operation by hanging up the handset to automatically send out a call-detection message (Notify: BUSY) that notifies the resource management server (C) of the station having entered the busy condition.

Upon accepting the message, the resource management server (C) updates the database to record the condition "busy" of the station (A') and, at the same time, answers by sending thereto a detection-accept message (Accept).

Following this, the called IP station (A') sends a call-answer message (200 OK) defined by RFC2543 to the SIP server (B).

The SIP server (B) transfers the call-answer response (200 OK) to the originating IP station (A) by control operations similarly defined by RFC2543 and, at the same time, sends an incoming call cancel message (CANCEL) to the incoming call management server (D) to notify that the called station has answered an incoming call.

The incoming call management server (D) answers by a cancel-accept message (200 OK) defined by RFC2543 and, at the same time, sends to the resource management server (C) a message (Notify: idle) indicating the absence of incoming call queue information.

Upon accepting the message, the resource management server (C) deletes incoming call queue information and answers by an incoming call queue cancel accept message (Accept).

Upon accepting the call-answer message (200 OK), the originating station (A) sends out acknowledge message (ACK) defined by RFC and starts a voice packet communication.

Upon accepting the acknowledge message, the called station (A') starts a voice packet communication.

The originating station (A) and the called station (A') both send to the resource management server (C) a call-established message (Notify: Established a Call) indicating that they are busy.

Upon accepting the call-established message (Notify: Established a Call), the resource management server (C) updates the database to record that the both stations are busy, and sends a call-established accept message (Accept) to the both stations.

(3) Telephone Answering Service Sequence:

FIG. 7 is a diagrammatic showing a telephone answering service sequence in the IP telephone system of the present invention.

A telephone answering service (referred to "surrogate") IP station (A"), which is not ringing, performs a surrogate answer operation as by pressing a surrogate answer button and hanging up the handset to automatically send out a detection message (Notify: BUSY) for notifying that the resource management server (C) of the station has entered the busy condition.

Upon accepting the message, the resource management server (C) updates the database to record the condition "busy" of the surrogate answer IP station (A") and, at the same time, sends out an acquisition-accept message (Accept) in answer to the notification.

The surrogate answer IP station (A") sends an incoming call information request (Require: INCOMING INFORMATION) to the incoming call control server (D) to inquire whether or not there is an incoming call to be answered by the surrogate IP terminal.

The incoming call management server (D) makes a check to see if there is queued incoming call information, and if so, sends an originating message (INVITE" defined by RFC543) to the surrogate answer IP station (A").

The surrogate answer IP station (A") answers by a temporary accept-answer message (100 Trying) defined by RFC2543, and then sends out a call-answer message (200 OK) to the incoming call management server (D).

The incoming call management server (D) transfers the call-answer message (200 OK) to the SIP server (B) under the control defined by RFC2543 and, at the same time, sends out to the resource management server (C) a message (Notify: idle) indicating the absence of incoming call queue information.

Upon accepting the message, the resource management server (C) deletes the incoming call queue information and answers by an incoming call queue delete-accept message (Accept).

The SIP server (B) transfers the call-answer message (200 OK) to the originating IP station (A) under the control similarly defined by RFC2543.

Upon accepting the call-answer message (200 OK), the originating IP station (A) sends out an acknowledge message (ACK) defined by RFC2543 and starts a voice packet communication.

Upon accepting the message, the surrogate answer IP station (A") starts the voice packet communication.

The SIP server (B) sends out, under the control defined by RFC2543, to the original called IP station (A') an incoming call cancel message (CANCEL) to notify it of an incoming call having been answered.

The original called IP station (A') answers by a cancel accept message (200 OK) defined by RFC2543 and, at the same time, sends out to the resource management server (C) a message (Notify: idle) indicating that the station is idle.

Upon accepting the message, the resource management server (C) updates the database to record the condition "idle" of the original called IP station (A'), and answers by an idle-accept message (Accept).

The originating station (A) and the surrogate answer station (A") both send out to the resource management server (C) the call-established message (Notify: Established a Call) to notify it that they are busy.

Upon accepting the message, the resource management server (C) updates the database to record the condition "busy" of each of the originating station (A) and the surrogate answer station (A"), and sends the call-established accept message (Accept) to the both stations.

While the present invention has been described above as being applied to a case where the application server function is the incoming call server function, the invention permits using, as the application server function, such as an ACD (Automatic Call Distribution) function in the telephone communication system, or IVR (Interactive Voice Response), voice mail, charging equipment, teleconferencing system by multi-participants, or similar function.

As described above in detail, the present invention permits a system extension not dependent solely on the ability of the centralized controller, by distributing he hardware configuration over LAN stations. Further, the present invention enables a subscriber's lamp or LCD to display the state of other subscriber stations. The telephone communication system according to the present invention is of great utility when applied to IP. ACD function, IVR, voice mail, charging equipment, teleconferencing system by multi-participants, and so forth.

What I claim is:

1. A telephone communication system, comprising:
    a plurality of telephone stations connected to a LAN network for providing said communication system based on an Internet protocol to form an IP network including at least one constituent unit; and
    server means connected to said LAN network for controlling communications performed by using said plurality of telephone stations;
    wherein said plurality of telephone stations and said server means are connected to said LAN network to form at least one node unit of said telephone communication system,
    for each constituent unit of said server means comprising:
    SIP server means based on a protocol defined for controlling the start, end, and change of a session of an interactive communication operation in said telephone communication system;
    resource management server means for controlling station state databases of said telephone stations to store station state data, which indicates a usage state of the telephone station, into the station state databases and deliver the station state data stored in the station state databases; and
    application server means connected to said LAN network for providing additional service for said plurality of telephone stations;
    said SIP server means, said resource management server means, and said application server means being connected to said LAN network for offering required services to said plurality of telephone stations,
    information transmission among said plurality of telephone stations and each of said server means being performed on a packet-by-packet basis.

2. A telecommunication system according to claim 1, in which said application server means is an incoming call management server for controlling incoming call information.

3. A telecommunication system according to claim 1, in which said LAN network is connected to the Internet; and an edge part connected to said LAN network has placed therein a firewall for protecting against unauthorized access to said LAN network.

4. A telecommunication system according to claim 1, in which at least one of said plurality of telephone stations is connected via a gateway to a public telecommunications network.

5. A telecommunication system according to claim 2, in which said LAN network is connected to the Internet; and an edge part connected to said LAN network has placed therein a firewall for protecting against unauthorized access to said LAN network.

6. A telecommunication system according to claim 2, in which at least one of said plurality of telephone stations is connected via a gateway to a public telecommunications network.

* * * * *